J. R. LOGAN.
HANDLE BAR FOR BICYCLES.
APPLICATION FILED JAN. 8, 1908.
938,255.
Patented Oct. 26, 1909.
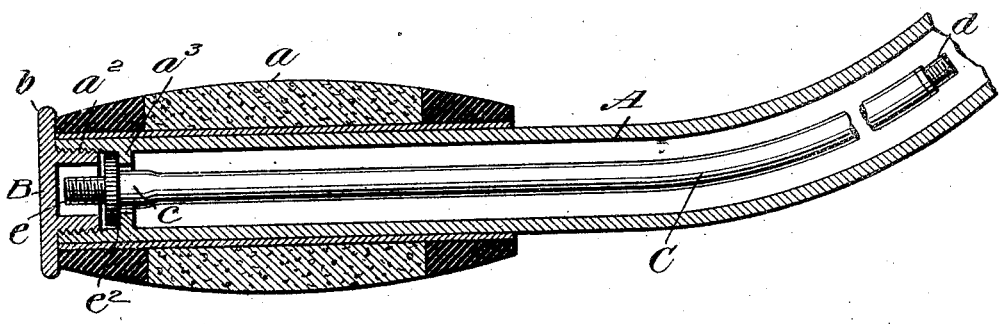
WITNESSES
Edward Thorpe
J. P. Davis
INVENTOR
James R. Logan
BY
Munn & Co.
ATTORNEYS

UNITED STATES PATENT OFFICE.

JAMES ROLLIN LOGAN OF FRESNO, CALIFORNIA.

HANDLE-BAR FOR BICYCLES.

938,255.  Specification of Letters Patent.  Patented Oct. 26, 1909.

Application filed January 8, 1908. Serial No. 409,794.

*To all whom it may concern:*

Be it known that I, JAMES ROLLIN LOGAN, a citizen of the United States, and a resident of Fresno, in the county of Fresno and State of California, have invented a new and Improved Handle-Bar for Bicycles, of which the following is a full, clear, and exact description.

The purpose of this invention is to provide a handle bar for bicycles which serves as a receptacle, in which the hose employed in connection with a pump for inflating the tires may be stored when not in use.

The invention consists in the novel construction and combination of parts, as is hereinafter described and defined in the appended claims.

Reference is to be had to the accompanying drawing forming a part of this specification, in which the view is a longitudinal section of a portion of a handle bar embodying my invention.

Referring to the drawing A is a hollow handle bar having a grip $a$ which may be of any suitable construction. The end of the handle bar is internally screw threaded as shown at $a^2$ and is provided adjacent to said threaded portion with an internal flange or collar $a^3$. A hollow plug B exteriorly threaded and having a closed outer end, from which projects a radial flange $b$, screws into the end of the handle bar and closes the same.

C represents a hose which is to be employed with a pump for inflating the tires. The hose C is provided at one end with a threaded nipple $d$ adapted to be screwed into a pump barrel and at its other end with the threaded nipple $e$ adapted to be screwed into a socket on the bicycle wheel rim.

The nipple $e$, is a short tube threaded externally from one end for a portion of its length, and at the termination of this thread a radial flange or collar $e^2$, is formed on the body of the nipple, said flange or collar having a circular milled edge. Upon the remaining end of the nipple $e$, the corresponding end $c$ of the hose C is mounted, the material of the elastic hose being expanded while being placed thereover, so that the joint between the nipple and the hose end is air tight.

It will be seen that the hose C may be readily connected with a pump and a wheel when a tire is to be inflated, and as readily disconnected therefrom after the tire has been inflated.

When the hose C has been removed from the wheel rim and barrel of the pump, it may be quickly housed in the handle bar A, by removing the hollow plug B therefrom, which will permit the end of the hose having the nipple $e$ thereon, to be inserted into the open end of the handle bar. When fully inserted, the radial flange $e^2$ of the nipple will be impinged upon the internal flange $a^3$ of the handle bar which will prevent the further inward movement of the hose within the handle bar, whereupon the replacement of the plug B will close the end of the handle bar and secure the hose in place therein.

By stowing the hose on the bicycle, it is always at hand ready to be used whenever desired, and by utilizing the handle bar for the storage of the hose, a receptacle for the purpose is provided, which is not in the way and which is very cheap adding but little to the cost of the handle bar.

I claim—

1. A hollow handle bar adapted to form a storage chamber for a hose of a bicycle pump, having its end screw threaded and provided with an internal flange adjacent to said end, and a screw threaded closure for the end of the handle bar and between which and the flange of the handle bar, the flange of the nipple of the hose is held when the hose is in said handle bar.

2. A hollow handle bar adapted to form a storage chamber for a hose of a bicycle pump, having its end internally screw-threaded and provided with an internal flange adjacent to its end, said flange serving as a stop against which the flange of the nipple of the hose is adapted to abut, and a flanged and exteriorly threaded plug for closing the end of the handle bar, said plug screwing into the handle bar with its end spaced a short distance from the flange thereof.

In testimony whereof I have signed my name to this specification in the presence of two subscribing witnesses.

JAMES ROLLIN LOGAN.

Witnesses:
R. N. BARSTOW,
C. L. HATHAWAY.